United States Patent [19]

Yoneda et al.

[11] Patent Number: 4,603,022

[45] Date of Patent: Jul. 29, 1986

[54] GAS-LIQUID CONTACTOR

[75] Inventors: Kenichi Yoneda; Mamoru Tamai; Masatoshi Katayama; Takeyasu Watanabe, all of Hiroshima, Japan

[73] Assignee: Mitsubishi Jukogyo Kabushiki Kaisha, Tokyo, Japan

[21] Appl. No.: 672,156

[22] PCT Filed: Aug. 15, 1979

[86] PCT No.: PCT/JP79/00213

§ 371 Date: Apr. 8, 1980

§ 102(e) Date: Apr. 8, 1980

[87] PCT Pub. No.: WO80/00418

PCT Pub. Date: Mar. 20, 1980

Related U.S. Application Data

[63] Continuation of Ser. No. 196,043, Apr. 8, 1980, abandoned.

[30] Foreign Application Priority Data

Aug. 15, 1978 [JP] Japan .................................. 53-99267

[51] Int. Cl.[4] ............................................... B01F 3/04
[52] U.S. Cl. ................................ 261/114 R; 202/158; 203/DIG. 24; 261/114 VT
[58] Field of Search ......... 261/114 R, 114 A, 114 JP, 261/114 TC, 114 VT; 202/158; 203/DIG. 24

[56] References Cited

U.S. PATENT DOCUMENTS

| | | | |
|---|---|---|---|
| 2,366,958 | 1/1945 | Dennis | 203/DIG. 24 |
| 2,884,236 | 4/1959 | Maille | 261/114 R |
| 3,045,989 | 7/1962 | Kittel | 261/114 R |
| 3,215,414 | 11/1965 | Van't Sant | 261/114 R |
| 3,362,696 | 1/1968 | Vaughan | 261/114 R |
| 3,729,179 | 4/1973 | Keller | 261/114 R |

Primary Examiner—Richard L. Chiesa
Attorney, Agent, or Firm—Wyatt, Gerber, Shoup, Scobey and Badie

[57] ABSTRACT

In a tray-type gas-liquid contactor, such as a distillation, rectification, or absorption column, in which mass transfer is effected between gas and liquid through a gas-liquid contact, the height of both wing parts of a weir provided along the periphery of the tray is made not less than 1.2 times that of the central part so that, when the contactor is installed, for example, on a floating offshore structure, the performance of the apparatus is not adversely affected by an inclination or oscillating motion.

3 Claims, 11 Drawing Figures

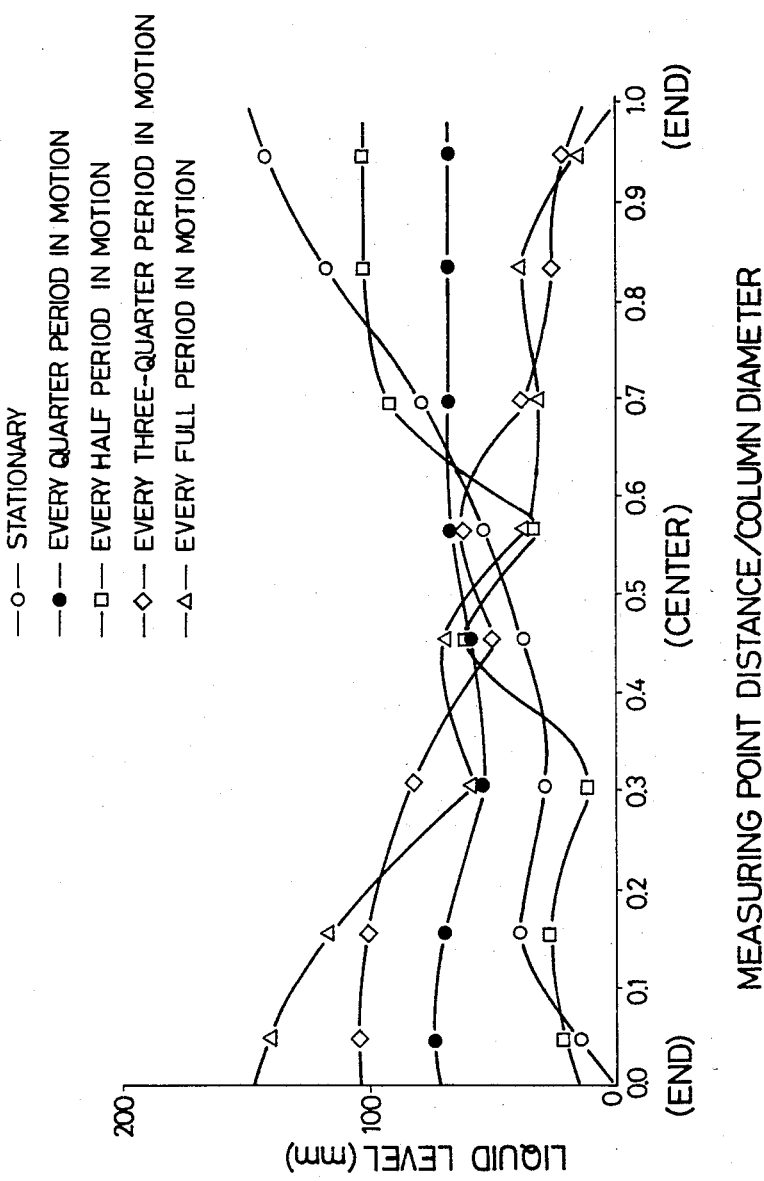

GAS-LIQUID CONTACTOR

RELATED APPLICATION

This application is a continuation application of co-pending patent application Ser. No. 196,043, filed Apr. 8, 1980 and now abandoned.

TECHNICAL FIELD

This invention relates to a gas-liquid contactor, and more specifically to a tray-type gas-liquid contactor to be installed on an inclined or unsteady, oscillating base such as of a floating offshore plant.

BACKGROUND ART

Gas-liquid contactors, e.g., columns for distillation, rectification, and absorption processes, are in very extensive use at chemical plants for the separation or purification of mixtures, removal of trace ingredients, or for other purposes.

Typically, the equipment is built of a vertical cylinder having a number of trays held inside so that vapor is forced through liquid held up on the trays to effect gas-liquid contacting. Recently, offshore plants, or large-scale chemical plants constructed on floating offshore structures for natural gas liquefaction, ethylene manufacture, ammonia synthesis, urea processing and other processes, have come into practical use.

With those offshore plants it is inevitable that the structures are subjected to periodic pitching, rolling, or other oscillating motion or to static inclination by the external forces of waves, winds, tides, currents, ect. Accordingly, the gas-liquid contactors, which usually are 50 meters or more in height, can be seriously influenced by slight oscillation, leading to inadequate vapor-liquid contact due to channelling of the liquid on the trays and noncontact flow of the gas stream and hence to poor separation performance of the apparatus.

Responsible for the consequence is the construction of the contactors. The oscillating motion causes changes in the quantities of holdups on the trays from those in level operation and also invites uneven distribution of the liquid level on each tray, deep here and shallow or totally free of the liquid there.

The problems common to the existing equipment will now be more fully explained with reference to the drawing.

As a typical example of the conventional tray-type gas-liquid contactors, a distillation column is shown, in a schematic section, in FIG. 1. Inside the body 1 in the form of a vertical cylinder, there are mounted a number of trays 2. The periphery of each tray 2 is partly recessed to provide a space between itself and the inner wall surface of the body 1, and a weir 3 is attached perpendicularly to the recessed edge. The weir 3 extends downward short of the tray 2 immediately below, leaving a gap between its lower end and the lower tray while, at the same time, forming a downcomer 4 for falling liquid between itself and the inner wall surface of the body 1. Each tray 2 is formed with a multiplicity of holes 5 for the upward flow of gas therethrough. Liquid collects on each tray 2.

Gas is introduced into the lower part of the body 1, and flows upward through the holes 5 of the trays 2. Meanwhile, liquid is supplied to the uppermost tray 2 in the upper part of the body 1, and it overflows the weir 3 into the downcomer 4 to fall onto the next tray 2. As the gas from the holes 5 of the tray ascends through the liquid held up thereon, gas-liquid contact takes place.

In case of a distillation column, the material to be distilled is fed to the tray 2 at an intermediate point of the body 1, and its gaseous components flow upward and its liquid components downward onto the next tray 2.

The conventional apparatus, when installed on the ground, would present no problem. However, on a floating offshore structure which will periodically oscillate or statically incline under the action of external forces, e.g., of waves, winds, tides, currents, etc., the gas-liquid contactor will exhibit, as indicated in FIG. 2, alternate liquid level distributions (A), (B) on each tray 2 such that the liquid level near the inner wall surface on one side of the body 1 in the oscillating direction is higher than near the opposite side. As a result, near the inner wall surface on one side of the body 1, the quantity of the liquid that overflows the weir 3 of the tray 2 into the downcomer 4 is large, and the period of staying time of the liquid flowing down from the both wings of the weir close to the inner wall surface of the body 1 is short. This brings disadvantages, such as low efficiency of contact between the gas and liquid that pass countercurrent on the trays and unsatisfactory performance of the apparatus.

DISCLOSURE OF THE INVENTION

The present invention has been perfected with the foregoing in view and has for its object to provide a gas-liquid contactor capable of maintaining good performance despite an oscillating motion, by uniformalizing the rate of overflow of the liquid per unit length of the weir, regardless of whether it is the central part or both wing parts of the weir. In accordance with the invention, a gas-liquid contactor is provided which has at least one tray mounted in a cylindrical body, in such a manner that a space is provided between the inner wall surface of the body and a part of the periphery of the tray, and a weir attached to that peripheral part of the tray forming the space, with the upper edge of the weir extending above the tray, said tray being formed with a plurality of holes for the passage of gas therethrough, characterized in that the height of the both wing parts of the weir is not less than 1.2 times that of the central part.

With the gas-liquid contactor provided by the invention wherein the both wing parts of the weir close to the inner wall surface of the body are not less than 1.2 times as high as the central part, it is possible to attain an improved gas-liquid contacting efficiency by uniformalizing the rates of overflow from the central and both wing parts of the weir, even when the liquid level on either or both peripheral parts of the tray close to the inner wall surface of the body rises or alternately rise above that in the central part due to oscillations or inclination of the apparatus as a whole. Therefore, the contactor is most suited for installation on a floating offshore structure or other such structure which is itself oscillated or inclined by external forces.

BRIEF DESCRIPTION OF DRAWINGS

FIG. 11 is a graphic representation of the liquid level distribution on the tray at every quarter of period in motion, the liquid level (in mm) being plotted as ordinate and the location of measuring points at regular intervals across a tray, whose diameter is assumed to be 1.0 in the oscillating direction, as abscissa.

Throughout these figures the numerals designate the following parts:

11 ... body of distillation column; 12 ... tray; 13 ... downcomer; 14 ... reboiler; 15 ... waste drain line; 16 ... condenser; 17 ... distillate outlet line; 18 ... material feed line; 19 ... tray cap-receiving hole; 20 ... tray cap; 21 ... weir; 21a ... main weir; 21b ... sub-weir; 30 ... upward gas stream; 31 ... downward liquid stream.

BEST MODE FOR CARRYING OUT THE INVENTION

Figure 1:
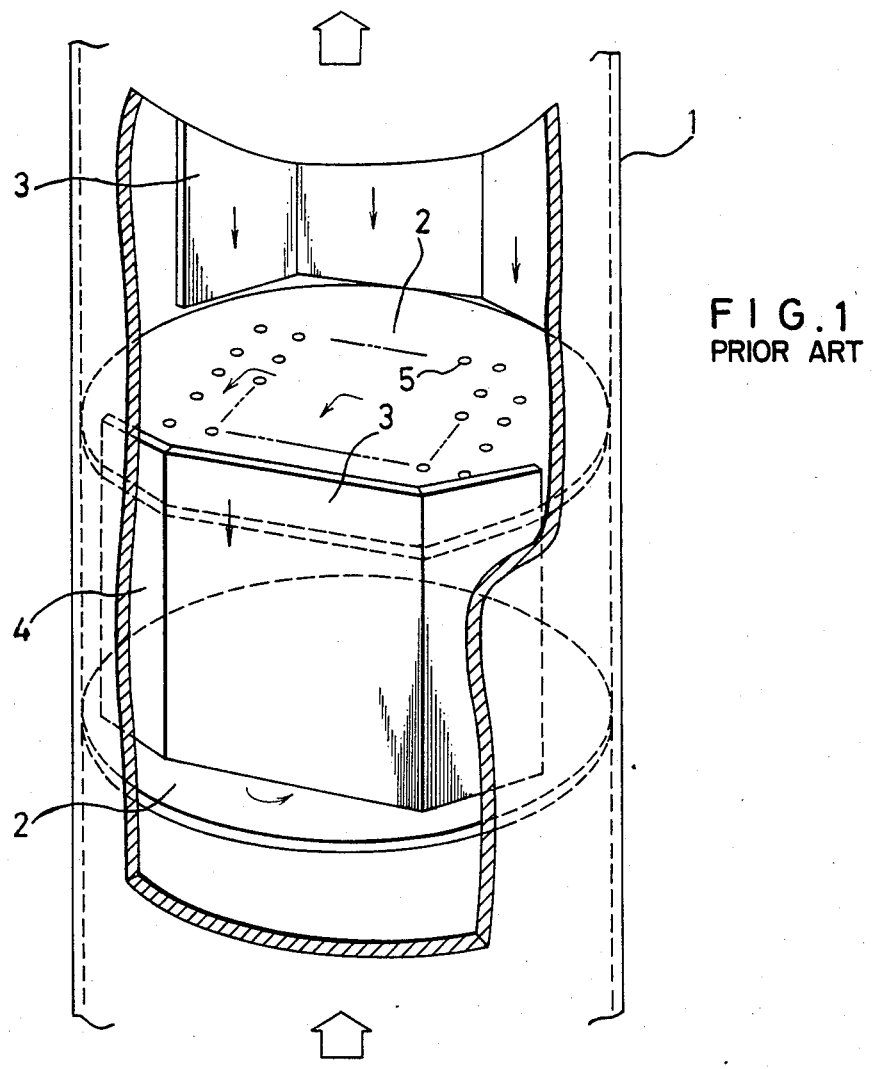
FIG. 1 is a partly broken, fragmentary perspective view of a conventional gas-liquid contractor.
Figure 2:
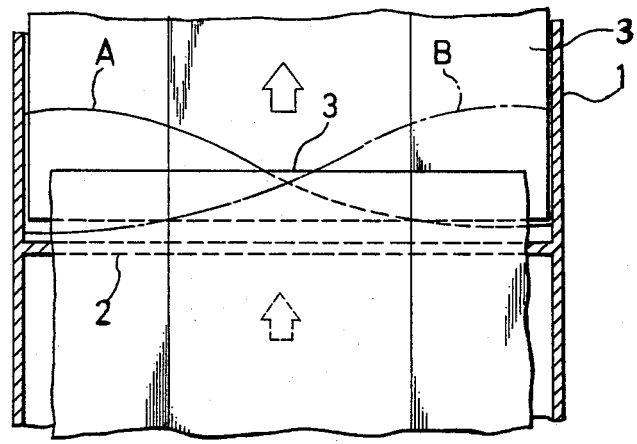
FIG. 2 is a vertical sectional view of a part of the apparatus shown in FIG. 1.
Figure 3:
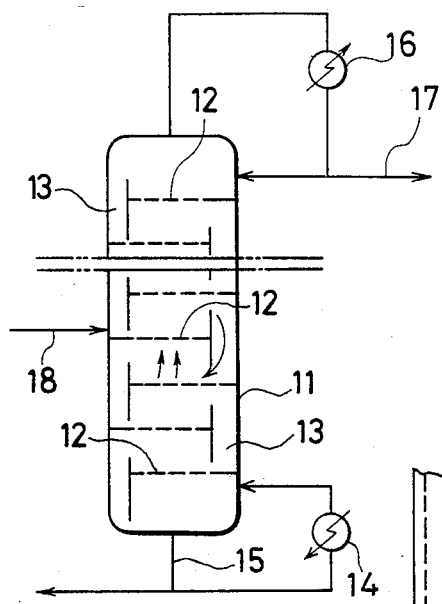
FIG. 3 is a schematic view of an embodiment of the invention as applied to a distillation column.

FIG. 3 is a schematic view of a distillation column as an embodiment of the gas-liquid contactor of the invention. The distillation column is shown comprising a cylindrical body 11 and trays 12 mounted in a plurality of stages within the body. Underneath the bottom of the body 11 are located a reboiler 14 and a waste drain line 15, and above the top of the body are provided a condenser 16 and a distillate outlet line 17. At an intermediate point of the body 11 is provided a material feed line 18.

Figure 4:
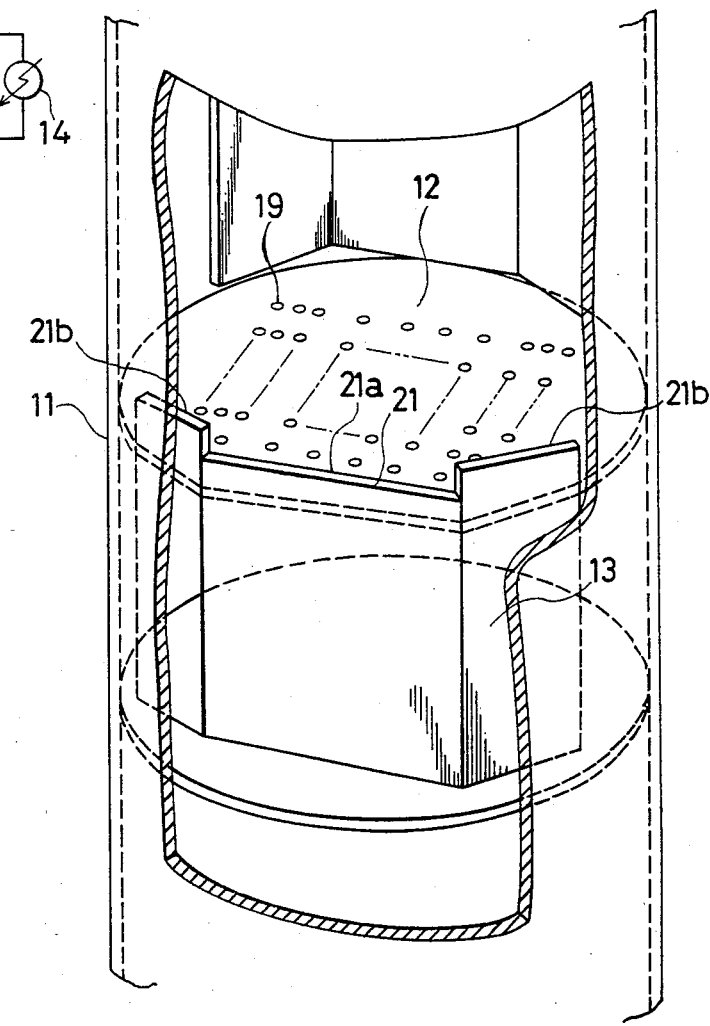
FIG. 4 is a partly broken fragmentary perspective view of the column shown in FIG. 3.
Figure 5:
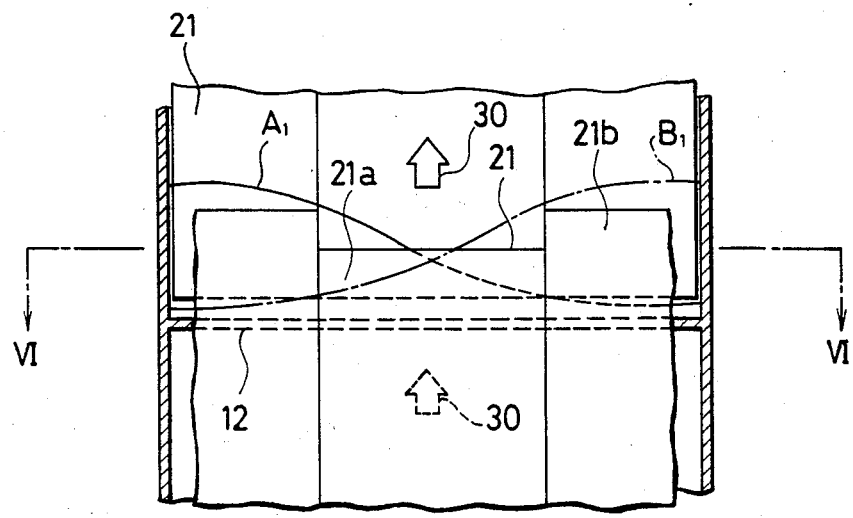
FIG. 5 is a sectional view of the same column taken along the line V—V of FIG. 6.
Figure 6:
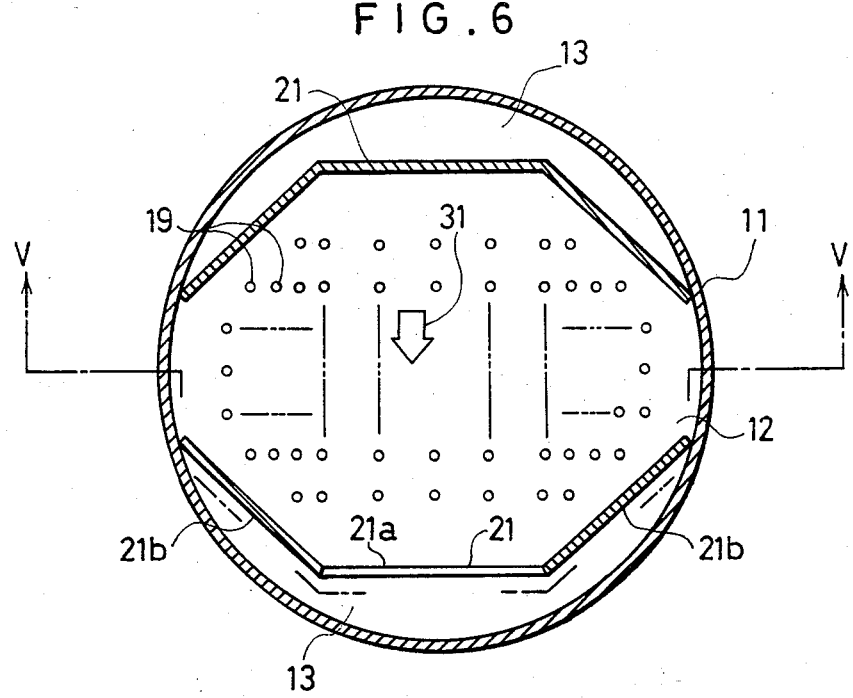
FIG. 6 is a sectional view taken along the line VI—VI of FIG. 5.
Figure 7:
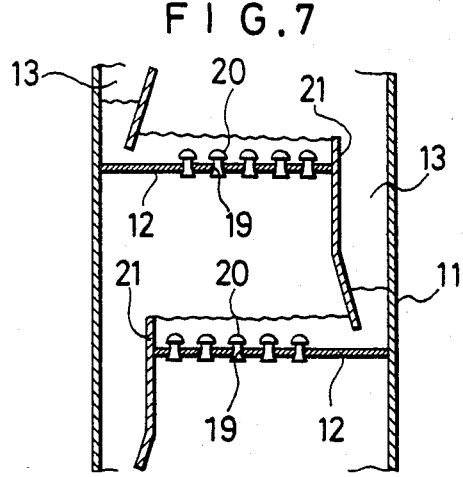
FIG. 7 is a vertical sectional view of a part of the distillation column.
Figure 8:
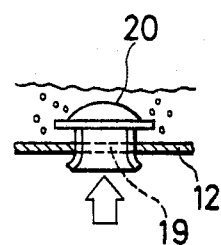
FIG. 8 is an enlarged view of a tray cap used in the same column.

As shown in FIGS. 4 through 7, the trays 12 are each formed with from tens to one hundred and several of holes 19 for holding tray caps thereon, each hole 19 for each cap 20. As illustrated on an enlarged scale in FIG. 8, the tray cap 20 consists of a disk having a plurality of legs with which to be raised above and supported by the tray 12, so that the gas can flow upward through the individual caps 20. The holes 19 of each tray 12 are formed, as shown in FIG. 6, in such a pattern that more holes are formed in the tray parts close to the inner wall surface than in the central portion of the body 11.

Further, as FIGS. 4 and 6 indicate, the tray 12 is partly recessed from the periphery to provide a space between the recessed edge and the inner wall surface of the body 11, and a weir 21 is attached perpendicularly to the edge. The weir 21 extends downward short of the tray in the stage immediately below, thus forming a downcomer 13 or passage for the downward flow of liquid between itself and the inner wall surface of the body 11. The weir 21, extending also upward of the associated tray, consists of a main weir part 21a in the form of a flat plate and sub-weir parts 21b also in the flat plate form and connected edgewise, as both wings, to the main weir part, the opposite edges of the sub-weir parts abutting against the inner wall surface of the body 11. The sub-weir parts 21b are not less than 1.2 times as high as the main weir part 21a. While the sub-weir parts 21b forming the both wings of the weir may have any desired width, they usually are made to have almost the same width. The proportion of the width of the main weir part 21a to the substantial overall width of the weir 21 can be determined experimentally depending on the actual conditions of operation.

According to this invention, as noted above, the sub-weir parts are made not less than 1.2 times as high as the main weir part 21a. In regard to this dimensional relationship, various oscillating motion tests were conducted to determine the liquid level distribution on the trays 12 in order to find out the optimum heights of the main and sub-weir parts 21a, 21b. As a result, it has now been found possible to obtain the optimum values by the following procedure.

The liquid level at a measuring point i on a tray 12 is calculated from Equation (1):

$$h_{di} = h_{si} + h_{ai} \cos(\omega t + \epsilon_i) \quad (1)$$

| where $h_{di}$: | liquid level at the measuring point i in motion (mm) |
|---|---|
| $h_{si}$: | liquid level at the measuring point i stationary (mm) |
| $h_{ai}$: | single-side amplitude at the measuring point i of the linearized liquid level variation in motion (mm) |
| $\omega$: | frequency of column motion (radian/sec) |
| $\Gamma$: | period of column motion ($\omega = 2\pi/\Gamma$) (sec) |
| $\epsilon_i$: | phase lag at the measuring point of the liquid motion amplitude behind the column motion amplitude (radian) |

Figure 9:
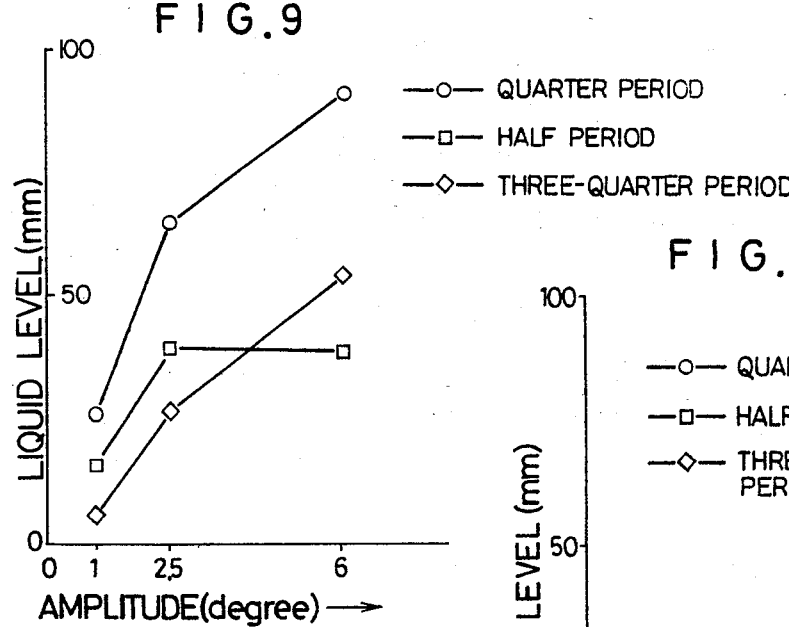
FIG. 9 is a graph showing the correlationship between the level of liquid on a tray end and the amplitude of motion (deg.) in oscillation.

In conformity with Eq. (1) the correlationship between the amplitude of motion and the level of liquid on each tray 12 can be known. The liquid level D at the peripheral ends of the tray is shown in FIG. 9 and the level $D_c$ on the center of the tray in FIG. 10. In preparing the data, the period of amplitude rotational oscillation was fixed to be 8 seconds.

Figure 10:
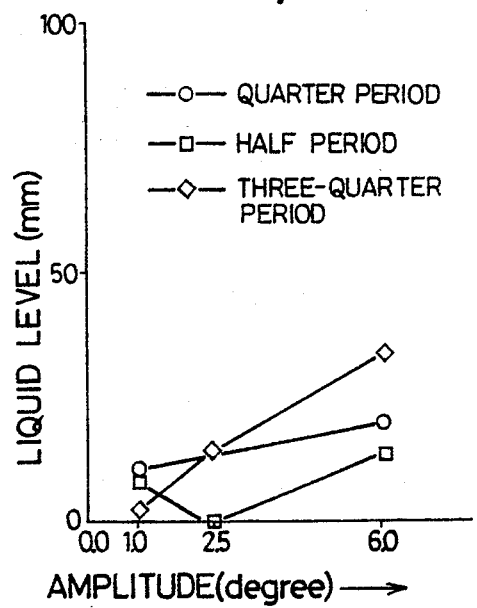
FIG. 10 is a graph showing the correlationship between the liquid level on the tray center and the amplitude of motion (deg.)

Thus, on the basis of FIGS. 9 and 10, optimum heights can be set for the main weir part 21a and the sub-weir parts 21b, the optimum height of the sub-weir parts 21b being from 1.2 to 3.0 times that of the main weir part 21a.

The operation of the distillation column constructed in the manner described above will now be explained.

Turning to FIGS. 3 to 6, material to be processed is fed to the column via the feed line 18, and a rising gas stream 30 is forced upward through the holes 19 of the trays 12. The ascending stream 30 impinges on the tray caps 20 and is thereby dispersed in the form of bubbles within the descending liquid 31 being held up on the trays 12, so that the bubbles and the descending liquid 31 make a gas-liquid contact. During this contact the downward liquid stream 31 absorbs heat from the bubbles surfaces, while the upward gas stream 30 takes up much low-boiling substances from the liquid.

The descending liquid 31 overflows the weir 21 of each tray into the downcomer 13 and thence onto the next tray 12 below. In this way the liquid flows downward onto the lower trays 12 and downcomers 13, in succession, until it reaches the bottom of the body 11. Beneath the body the liquid is vaporized by the reboiler 14 and fed back as the upward gas stream 30, whereas part of the liquid is discharged from the system via the waste drain line 15.

On the other hand, the ascending gas stream 30 repeats the gas-liquid contact with the descending liquid stream 31 on the successive trays 12 until the gas reaches the top of the column. Above the column it is liquefied by the condenser 16 to form the downward liquid stream 31, while part of the resulting liquid is discharged from the system through the distillate outlet line 17.

When this apparatus is carried by a floating offshore structure, which is caused to pitch, roll, or otherwise move oscillatingly or is statically inclined by the external forces of waves, winds, tides, currents, etc., the holdups on the trays 12 exhibit liquid level distributions as indicated, for example, (in FIGS. 5 and 11, the level near the surrounding wall of the column body ranging from about 1.2 to 3 times higher than that on the center of the same tray.

According to the present invention, the sub-weir parts 21a close to the inner wall surface of the body 11 are made not less than 1.2 times higher than the main weir part 21a in the center, and therefore the liquid will not overflow only from the sub-weir parts close to the inner wall surface of the body 11 even if the liquid level rises high on either of the tray parts corresponding to the weir parts.

Consequently, the rate of liquid overflow per unit length of the sub-weir parts 21b and that per unit length of the main weir part 21a are made uniform. This enables the descending liquid 31 to remain for an extended period of time over each tray 12 and permits all portions of the descending liquid to be held up for practically the same lengths of time, thus enhancing the distillation efficiency.

If the sub-weir parts 21b are too tall, the rate of overflow beyond those parts will decrease undesirably. Usually, the sub-weir parts are desired to be from 1.2 to 3.0 times as high as the main weir part 21a.

Also, in the apparatus of the invention, more holes 19 are formed in the parts of each tray 12 close to the inner wall surface of the body 11 than in the center of the tray, and therefore the distillation in the column progresses faster in the region close to the inner wall surface of the body 11 than in the central region. As a result, the composition of the liquid overflowing the sub-weir parts 21b into the downcomers 13 and that of the liquid overflowing the main weir parts 21a into the same downcomers are uniformalized. Moreover, because the holes 19 are formed more densely in the tray parts close to the inner wall surface of the body 11 than in the central part, an accordingly increased amount of the ascending gas 30 passes along and near the inner wall surface of the body, forcing the descending liquid on the trays 12 gradually toward the central parts, whereby any excessive increase in the liquid level close to the inner wall surface of the body can be avoided.

EXAMPLE

The distillation column described (and illustrated in FIGS. 4 to 8) was employed, while the column was being moved oscillatingly in the direction of the main weir part of each weir (i.e., diametrally of the column) at an amplitude of rolling of 2.5 deg. in periods of 8 seconds, absorption of ammonia gas by water was carried out and the efficiency of gas-liquid contacting was determined. The construction and operating conditions of the distillation column were as follows:

| | |
|---|---|
| Diameter of the body 11: | 1200 mm |
| Type of trays: | "Flexitray" one stage |
| No. of tray caps 20: | 66 |
| Diameter of holes 19: | 39 mm |
| Length of main weir part 21a: | 530 mm |
| Height of main weir part 21a: | 50 mm |
| Length of sub-weir part 21b: | 270 mm |
| Height of sub-weir part 21b: | 150 mm |
| Flow rate of gas: | 1100 m$^3$N/H |
| Flow rate of feed water: | 8 m$^3$/H |
| NH$_3$ conc. at the inlet: | 980 ppm |
| NH$_3$ conc. at the outlet: | 392 ppm |

The NH$_3$ absorption rate thus attained was 60%.

COMPARATIVE EXAMPLE

A distillation column of the same construction as the column used in above Example with the exception that the main weir parts 21a were 530 mm long and 80 mm high and the sub-weir parts 21b were 270 mm long and 80 mm or as high as the main parts, or a conventional apparatus, was employed. In this experiment the NH$_3$ concentration at the inlet was 965 ppm and that at the outlet was 630 ppm, indicating a low NH$_3$ absorption rate of only 35%.

While an embodiment of this invention has been described as including trays with weirs whose main and sub-weir parts all have straight, horizontal upper edges, it is not a limitation to the invention. The weirs may be arcuately shaped instead, in which case the both wing parts of the weirs may be varied in height stepwise or curvedly relative to the central parts so that the former parts can be not less than 1.2 times as high as the latter.

We claim:

1. A gas-liquid contactor mounted on an oscillating base having at least one tray mounted in a cylindrical body, said tray being formed with a periphery and a plurality of holes fitted with tray caps for the passage of gas therethrough, said cylindrical body being formed with inner and outer wall surfaces, the tray being formed and mounted in such a manner that a portion of said periphery is spaced apart from said inner wall surface, there being a weir attached to the spaced apart portion of said periphery and extending above the surface of said tray, said weir being formed with one central portion with two vertical edges and one wing portion connected to each vertical edge to form one notch, said wing portions being of uniform height and abutting against said inner wall surface, the height of said wing portions above the tray being from 1.2 to 3.0 times the height of said central portion above the tray, the density of the holes in the tray being greater in the tray parts close to the inner wall surface, the tray caps and the weir being the only attachments to the tray.

2. A gas-liquid contactor of claim 1 in which the central portion and the wing portions of said weir are flat plates.

3. A gas-liquid contactor of claim 1 in which the central portion and wing portions are arcuately shaped along said spaced apart portion of said periphery.

* * * * *